United States Patent
Xu et al.

(10) Patent No.: US 11,354,909 B2
(45) Date of Patent: Jun. 7, 2022

(54) ADAPTIVE QUEUE MANAGEMENT SYSTEM

(71) Applicant: International Business Machines Corporation, Armonk, NY (US)

(72) Inventors: Chang Xu, Beijing (CN); Junsong Wang, Beijing (CN); Hang Liu, Beijing (CN); Yan Gong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/583,604

(22) Filed: Sep. 26, 2019

(65) Prior Publication Data
US 2021/0097298 A1 Apr. 1, 2021

(51) Int. Cl.
*G06V 20/52* (2022.01)
*G06T 7/215* (2017.01)
*G06N 3/04* (2006.01)
*G01S 3/786* (2006.01)
*G06Q 30/02* (2012.01)
*G06V 40/10* (2022.01)

(52) U.S. Cl.
CPC ............ *G06V 20/53* (2022.01); *G01S 3/7864* (2013.01); *G06N 3/04* (2013.01); *G06Q 30/0201* (2013.01); *G06T 7/215* (2017.01); *G06V 40/103* (2022.01); *G06T 2207/30242* (2013.01)

(58) Field of Classification Search
CPC combination set(s) only.
See application file for complete search history.

(56) References Cited

U.S. PATENT DOCUMENTS

| | | | |
|---|---|---|---|
| 5,953,055 A | 9/1999 | Huang et al. | |
| 9,390,596 B1 | 7/2016 | Todeschini | |
| 9,426,627 B1 | 8/2016 | Logan et al. | |
| 10,248,943 B2 | 4/2019 | Richards | |
| 2010/0092037 A1* | 4/2010 | Peleg ................ | G11B 27/034 382/103 |
| 2010/0117790 A1* | 5/2010 | Bayne ................ | G07C 9/28 340/5.21 |
| 2010/0277276 A1* | 11/2010 | Bayne ................ | G07C 9/27 340/5.21 |

(Continued)

FOREIGN PATENT DOCUMENTS

| | | | | |
|---|---|---|---|---|
| CN | 105122270 | * | 12/2015 | ............ G06V 20/53 |
| CN | 105139040 | * | 12/2015 | ........... G06V 10/751 |
| CN | 110012422 | * | 7/2019 | ........... H04L 12/733 |

OTHER PUBLICATIONS

Kwak, Jin Kyung, "Analysis On The Effect Of Express Checkouts In Retail Stores", The Journal of Applied Business Research, Jul./Aug. 2017, vol. 33, No. 4, 8 pages, <https://www.google.com/url?sa=t&rct=j&q=&esrc=s&source=web&cd=3&cad=rja&uact=8&ved=2ahUKEwjzo4eevZXjAhUJPI8KHWnXCTsQFjACegQIAhAC&url=https%3A%2F%2Fclutejournals.com%2Findex.php%2FJABR%2Farticle%2Fdownload%2F9998%2F10099&usg=AOvVaw3Zm5ho_ZrHUfXGk-eRpfY9>.

(Continued)

*Primary Examiner* — Zhiyu Lu
(74) *Attorney, Agent, or Firm* — Sonny Z. Zhan

(57) ABSTRACT

In an approach for detecting queuing information, a processor analyzes a video monitoring a queue area. A processor detects a queue barrier in the queue area using an instance segmentation technique based on the video. A processor identifies a queue in the queue area using a heuristic technique. A processor recognizes a number of people in the queue. A processor provides an estimation of a wait time for the queue.

8 Claims, 8 Drawing Sheets

(56) References Cited

U.S. PATENT DOCUMENTS

| | | | | |
|---|---|---|---|---|
| 2013/0182114 A1* | 7/2013 | Zhang | ............ | A61B 5/0046 |
| | | | | 348/150 |
| 2015/0127401 A1* | 5/2015 | Hogg | ............ | G06Q 30/0281 |
| | | | | 705/7.15 |
| 2015/0310458 A1* | 10/2015 | Bernal | ............ | G06Q 30/0201 |
| | | | | 382/103 |
| 2015/0312529 A1* | 10/2015 | Bernal | ............ | G06T 7/246 |
| | | | | 348/148 |
| 2016/0005053 A1 | 1/2016 | Kilma et al. | | |
| 2019/0080178 A1* | 3/2019 | To | ............ | G06K 9/00771 |
| 2020/0226523 A1* | 7/2020 | Xu | ............ | G06K 9/00369 |
| 2021/0032822 A1* | 2/2021 | Balogh | ............ | E01F 13/022 |

OTHER PUBLICATIONS

Neven et al., "Towards End-to-End Land Detection: an Instance Segmentation Approach", Computer Science, Computer Vision and Pattern Recognition, Cornell University, Feb. 15, 2018, 7 pages, <https://arxiv.org/abs/1802.05591v1>.

Zhang et al., "AlignedReID: Surpassing Human-Level Performance in Person Re-Identification", Computer Science, Computer Vision and Pattern Recognition, Cornell University, Jan. 31, 2018, arXiv:1711.08184, 10 pages, <https://www.bing.com/search?q=AlignedReID%3A+Surpassing+Human-Level+Performance&qs=n&form=QBLH&sp=-1&pq=alignedreid%3A+surpassing+human-level+performa&sc=0-44&sk=&cvid=C9287289627E4282922FB57EB5D98EFA>.

Mell et al., "The NIST Definition of Cloud Computing", Recommendations of the National Institute of Standards and Technology, Special Publication 800-145, Sep. 2011, 7 pages.

\* cited by examiner

ADAPTIVE QUEUE MANAGEMENT SYSTEM

BACKGROUND

The present disclosure relates generally to the field of monitoring a queue area using a video surveillance system, and more particularly to detecting and analyzing queuing information with deep learning techniques.

Deep learning is part of a broader family of machine learning methods based on artificial neural networks. Learning can be supervised, semi-supervised or unsupervised. Deep learning architectures such as deep neural networks, deep belief networks, recurrent neural networks and convolutional neural networks have been applied to fields including computer vision, speech recognition, natural language processing, audio recognition, social network filtering, machine translation, bioinformatics, drug design, medical image analysis, material inspection and board game programs.

SUMMARY

Aspects of an embodiment of the present disclosure disclose an approach for detecting queuing information. A processor analyzes a video monitoring a queue area. A processor detects a queue barrier in the queue area using an instance segmentation technique based on the video. A processor identifies a queue in the queue area using a heuristic technique. A processor recognizes a number of people in the queue. A processor provides an estimation of a wait time for the queue.

DETAILED DESCRIPTION

Figure 1:
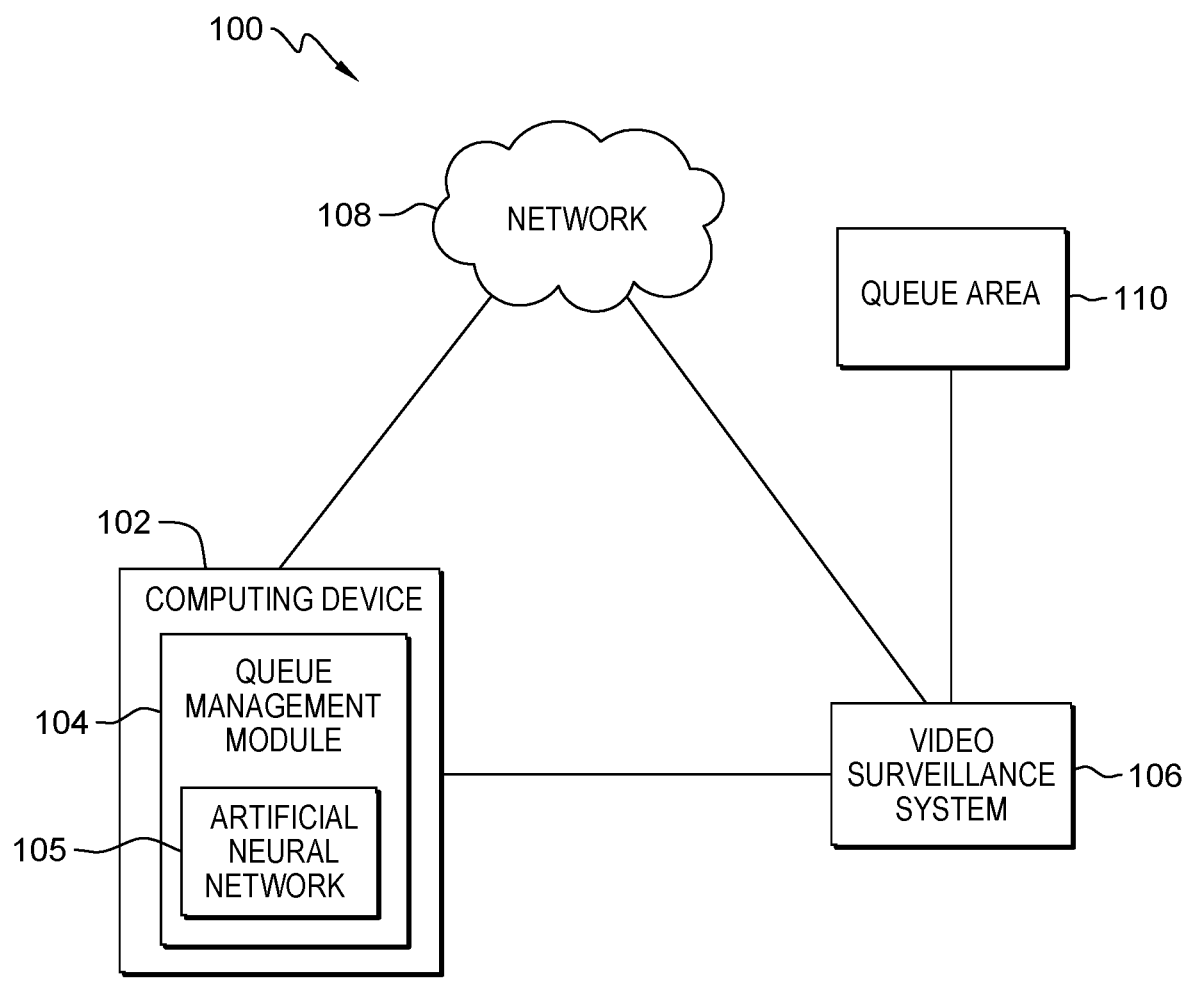
FIG. 1 is a functional block diagram illustrating a queue management environment, in accordance with an embodiment of the present disclosure.

The present disclosure is directed to systems and methods for detecting and analyzing queuing information from a video surveillance system with advanced deep learning techniques.

The present disclosure discloses a queue management system that can help identify the number of people waiting in lines and further estimate wait time for each queue in a queue area. In various embodiments of the present disclosure, the queue area can be an airport service area, a supermarket checkout area, a bus station ticket area, a bank teller area, a hotel service area, and a government service area (e.g., department of motor vehicles, social security office, etc.). The queue management system may help managers adjust the number of service counters in-use to improve customer experience. It is observed that tensile barriers are commonly used to help separate different queues. Managers can add or remove some tensile barriers in practice. Thus, the shape and length of queues is complicated and changeable. The present disclosure discloses a method to automatically identify queues and detect queue shape change. The queue management system can identify the number of people waiting in the queue, count the length for each queue and further estimate a wait time for each queue.

The queue management system can handle quick and complicated change of tensile barriers separated queues. In this solution, the system can answer the following questions: 1) how many queues exist in the video; 2) how many people are waiting in each queue; 3) what the wait time for each queue is. The system deploys deep learning-based computer vision techniques to detect tensile barriers. The system identifies queues separated by different tensile barriers. The system may recognize and count people in different queues. The system is accurate and fast to facilitate real-time solution.

The present disclosure discloses a computer vision-based solution. The system may apply an object detection model to detect pedestrians and service counters. The system may apply an instance segmentation method to detect the tensile barriers. The system may propose an area segmentation method to identify queues separated by different tensile barriers. The system may map people in the queue into different queues based on their physical locations.

In an example, one common queue setting is that people are separated by several tensile barriers. Different queues are inside different regions. However, such queue management is quite complicated. Since queue settings can be any shape and changeable as time goes on, the present disclosure recognizes a solution and discloses an adaptive queue management system that can automatically update queue settings for barriers-separated queues, for example tensile barriers-separated queues. More specifically, the present disclosure solves two fundamental problems. One is how many queues exist in a queue area. The other one is how to estimate a wait time for each queue.

The present disclosure discloses a system which can identify tensile barriers, queue area partition, and queue people projection. For tensile barriers detection, the present disclosure recognizes that a conventional object detection method cannot handle ribbon-like objects. Thus, the system applies an instance segmentation method that can successfully identify different tensile barriers. The system includes a heuristic method that generates different queuing partitions. The system may calculate a convex hull of adjacent tensile barriers. In order to find a more precise boundary, the system may analyze a skeleton of tensile barriers and modify the convex hull with the skeleton. After finding a queue partition, the system can recognize people in different queue partitions. By analyzing the skeleton of the tensile barriers, the system can also find the exit and entrance points of a queue. The system observes theses points and does feature matching at these points for a wait time estimation. In an example, features may be extracted with a re-identification technique. In order to handle the changeability of queue settings, the system counts the number of people in the queues and reports the queuing information including the number of queues, the locations of the queues, and a wait time for each queue in the queue area.

The present disclosure will now be described in detail with reference to the Figures. FIG. 1 is a functional block diagram illustrating a queue management environment, generally designated 100, in accordance with an embodiment of the present disclosure.

In the depicted embodiment, queue management environment 100 includes computing device 102, video surveillance system 106, queue area 110, and network 108. Queue area 110 is generally an area that people wait in lines, for example, for a service. In various embodiments of the present disclosure, queue area 110 can be an airport service area, a supermarket checkout area, a bus station ticket area, a bank teller area, a hotel service area, and a government service area (e.g., department of motor vehicles, social security office, etc.). In one or more embodiments, features of queue area 110 can be identified by a trained neural network, where objects such as counters, desks, monitors/computer terminals, cash registers, scales, etc. can be used to identify queue area 110 within a monitored area. The objects and features defining queue area 110 may be distinguished by a fixed position within the digital video camera's field of view.

Video surveillance system 106 is a system that can monitor queue area 110. In an example, video surveillance system 106 includes a digital video camera that can observe and record multiple digital images of queue area 110. The number of digital images recorded by the video camera can depend on the frame rate of the camera, where a frame is one of the many still images which compose a digital video segment (e.g., a moving picture). The digital video camera can capture the activities occurring within the camera's field of view, where the size of the field of view can be determined by the type of camera and optics/lenses employed. In various embodiments, multiple cameras can observe the same area from different vantage points for surveillance.

In various embodiments, queue area 110 being monitored by video surveillance system 106 may be a waiting area (e.g., at an airport or bus depot), checkout lines (e.g., for a retail store), or a service line (e.g., at a bank, hotel, department of motor vehicles, etc.). The observed area within the field of view of the camera, also referred to as the monitored area, (where objects outside the field of view are not recorded when the picture is taken) may contain a number of people and/or physical objects.

In one or more embodiments, video surveillance system 106 can identify the number of people in queue area 110. The video camera can capture the digital images of the physical area observed by the camera. The digital images can be processed by computing device 102 running a neural network to identify the number of people present in the field of view (i.e., area) captured in the digital image.

In the depicted embodiment, video surveillance system 106 is located externally from computing device 102. Video surveillance system 106 can be accessed through a communication network such as network 108 or directly by computing device 102. However, in other embodiments, video surveillance system 106 may be located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to queue management module 104 and network 108 and is capable of processing program instructions and executing queue management module 104, in accordance with an embodiment of the present disclosure. Computing device 102 may include internal and external hardware components, as depicted and described in further detail with respect to FIG. 4.

Further, in the depicted embodiment, computing device 102 includes queue management module 104. In the depicted embodiment, queue management module 104 is located on computing device 102. However, in other embodiments, queue management module 104 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and queue management module 104, in accordance with a desired embodiment of the disclosure. In another example, queue management module 104 may be located in video surveillance system 106.

Further, in the depicted embodiment, queue management module 104 includes artificial neural network 105. In the depicted embodiment, artificial neural network 105 is located on queue management module 104 of computing device 102. However, in other embodiments, artificial neural network 105 may be located externally and accessed through a communication network such as network 108. Artificial neural network 105 is an information processing system that is inspired by biological nervous systems, such as the brain. The key element of artificial neural network 105 is the structure of the information processing system, which includes a large number of highly interconnected processing elements (called "neurons") working in parallel to solve specific problems. Artificial neural network 105 is furthermore trained in-use, with learning that involves adjustments to weights that exist between the neurons. For example, artificial neural network 105 can be configured to apply an instance segmentation method to detect queue barriers in queue area 110. In an example, artificial neural network 105 is a convolutional neural network. The convolutional neural network may be a class of deep neural networks for analyzing visual imagery. The convolutional neural network may employ a mathematical operation called convolution. In general, convolution is a specialized kind of linear operation. The convolutional neural network may consist of an input and an output layer, as well as multiple hidden layers. The hidden layers of convolutional neural network may consist of a series of convolutional layers that convolve with a multiplication or other dot product. The convolutional neural network may use convolution in place of general matrix multiplication in at least one of their layers. An exemplary neural network and architecture of artificial neural network 105 are depicted and described in further detail with respect to FIG. 7 and FIG. 8.

In one or more embodiments, queue management module 104 receives and analyzes a live streaming video from video surveillance system 106 which monitors queue area 110. In various embodiments of the present disclosure, queue area 110 can be an airport service area, a supermarket checkout area, a bus station ticket area, a bank teller area, a hotel service area, and a government service area (e.g., department of motor vehicles, social security office, etc.). In one or more embodiments, features of queue area 110 can be identified by artificial neural network 105, where objects such as counters, desks, monitors/computer terminals, cash registers, scales, etc. can be used to identify queue area 110. Queue area 110 includes queue barriers that are used to help separate different queues in queue area 110. Managers can add or remove queue barriers based on changes of queues. Thus, the shape and length of queues is complicated and changeable. In an example, queue barriers are tensile barriers. In another example, queue barriers can be any barrier to separate queues.

In an example, queue management module 104 may sample the live streaming video into digital images or frames. In another example, video surveillance system 106 may include a digital video camera and can take and record digital images directly.

In one or more embodiments, queue management module 104 analyzes the live streaming video and the captured images obtained from video surveillance system 106 by artificial neural network 105. In various embodiments, the captured images can be input into artificial neural network 105 as a numerical array with height, width, and depth, where the height and width can be determined by the resolution and color scale of the digital image, for example: 1280 pixel width×720 pixel height with a depth of three (3) for the red, green, blue (RGB) colors for 720p resolution; 1920 pixel width×1080 pixel height and a depth of 3 for 1080p; or 3840 pixel width×2160 pixel height and a depth of 3 for 4K resolution. The numerical array can be processed by a convolutional neural network using filters, where the filters can have a width, height, and depth less than the input image, and can be applied to convert blocks of the image array into column vectors.

In various embodiments, the input image can be analyzed to identify one or more heads, where artificial neural network 105 can be trained to identify heads in the image. In various embodiments, supervised learning can be used to identify heads, where all heads in an image can be labeled, and the labeled images used to train the neural network through supervised and/or unsupervised learning. With advanced object detection algorithm(s) and a stochastic gradient descent optimization method, artificial neural network 105 has the capability to identify heads and ignore similar round objects. In various embodiments, since heads contain little semantic features (they are mostly similar), particular features of heads are not extracted. In various embodiments, local image patches (e.g., blocks) of the input image can each be analyzed to identify one or more heads. The identified heads can be counted to take a headcount in the digital image.

In various embodiments, the blocks and filters may have a size optimized for identifying heads in the field of view of the camera, where the resolution of the image, the distance of the camera from the objects in the field of view, and the scaling of the image can influence the number of pixels that would depict an average head. In various embodiments, for example, the heads can be 20×20 pixels of the digital image or larger, where the block size can be adjusted to optimize (e.g., increase confidence values) that all or almost all heads are correctly identified.

In various embodiments, once the heads have been identified in the input image, the number of identified heads can be counted to establish an initial estimate of people in the monitored area of queue area 110. Since heads may be obscured or not identified with 100% accuracy, the number of heads counted may not be identical to the exact number of people present in the monitored area.

In various embodiments, the input image can be analyzed to identify one or more bodies, where artificial neural network 105 can be trained to identify bodies in the image. Features of a body can be extracted, for example, as a 2048 dimension vector that is not human-readable, where the extracted features can represent clothing (e.g., shirts, pants, etc.). Artificial neural network 105 can be a deep-learning neural network that extracts the features for building the feature vector. One or more filters can be applied to the input image to identify features of a body, where not all the features are necessarily present or observable in the image. In addition, the placement of some people in the field of view can obscure or occlude other people next to or behind them making identification of a distinct body difficult or impossible. Positioning of individuals' bodies in the image can be inconsistent, such that each block of the input image may contain no body, one body, or more than one body, at different times. The extracted feature vector can be used to track the placement and movement of identified bodies.

In various embodiments, once the bodies have been identified in the input image, the number of identified bodies can be counted to establish a second estimate of people in the monitored area of queue area 110. Since bodies may be obscured or not identified with 100% accuracy, the number of bodies counted may not be identical to the exact number of people present in the monitored area, and may be different from the number of heads counted.

In one or more embodiments, the number of heads and the number of bodies can be analyzed to arrive at a more accurate count of the number of people in the field of view of the digital video camera. The bodies and heads can be separately detected by artificial neural network 105. Bodies can be matched with heads based upon coinciding positioning. When a head is detected, but a corresponding body is not identified in an expected coinciding position, artificial neural network 105 can infer that an associated body is present (but possibly occluded) to rectify the number of heads to bodies (e.g., one (1) can be added to the number of identified bodies. The number of people present in the digital image can, thereby, be reconciled in favor of the number of heads. Similarly, artificial neural network 105 can infer that an associated head is present (but possibly occluded), when a corresponding head is not identified in an expected position for an identified body to rectify the number of bodies to heads. One (1) can be added to the number of identified heads. A Hungarian algorithm can be used to match heads with bodies and/or bodies to heads (i.e., rectified). A total number of people can then be determined from the rectified number of heads to bodies and rectified number of bodies to heads. If a head and a body can be matched based upon coinciding positioning, they can be identified (labeled) as belonging to same person. For heads (or bodies) that are unmatched, they can be identified (labeled) as belonging to new persons. Both head set and body set can be divided into matched subsets and unmatched subsets. In various embodiments, a final number of people can be calculated as the matched subset+the subset of unmatched heads+the subset of unmatched bodies.

In one or more embodiments, queue management module 104 detects queue barriers in queue area 110 based on the live streaming video, using instance segmentation techniques through artificial neural network 105. Queue management module 104 may detect and delineate each queue barrier in the input image from queue area 110. Queue management module 104 may identify each queue barrier through artificial neural network 105 based on the input image. There are various techniques that are used in computer vision tasks. Some of them include classification, semantic segmentation, object detection, and instance segmentation. Classification tells that the image belongs to a particular class. It doesn't consider the detailed pixel level structure of the image. It consists of making a prediction for a whole input. Semantic segmentation makes dense predictions inferring labels for each pixel so that every pixel in the image is labeled with the class of its enclosing object. Object detection provides not only the classes but also indicate the spatial location of those classes. It takes into account the overlapping of objects. Instance segmentation includes identification of boundaries of the objects at the detailed pixel level. In an example, artificial neural network 105 is a convolutional neural network that is a class of deep neural networks for analyzing visual imagery and applies an instance segmentation method to detect queue barriers in queue area 110. In another example, artificial neural network 105 is a mask region based convolutional neural network (Mask R-CNN) that creates a boundary around every object that is present in the given image. Mask R-CNN can locate each pixel of every object in the image. In another example, artificial neural network 105 can be any neural network that may apply an instance segmentation method to detect queue barriers in queue area 110.

In one or more embodiments, queue management module 104 identifies queuing area partition and each queue in queue area 110 using a heuristic method. A heuristic method is generally a method that ranks alternatives in search algorithms at each branching step based on available information to decide which branch to follow. In one or more embodiments of the present disclosure, queue management module 104 may first calculate the convex hull of adjacent queue barriers. In order to find a more precise boundary, queue management module 104 analyzes the skeleton of the queue barriers and modifies the convex hull with skeleton. After finding the partition of a queue, queue management module 104 can recognize people in the queue partition. An example for identifying a queue in queue area 110 is depicted and described in further detail with respect to FIGS. 3A-3D.

In one or more embodiments, queue management module 104 recognizes the number of people in each identified queue in queue area 110. As discussed above, queue management module 104 may identify the heads and bodies from the input image from video surveillance system 106 in queue area 110. After queue management module 104 identifies each queue in queue area 110, queue management module 104 may find the number of people in each queue based on the identified heads and bodies from the input image from video surveillance system 106 using a re-identification (Re-ID) technique. Object Re-ID generally means that a recognized object is identified again after imaging conditions (including monitoring scene, lighting conditions, object pose, etc.) change. A Re-ID technique is a technology that uses computer vision technology to judge whether there is a specific person or object in the image or video sequence. In deep learning method, the general technical route of object Re-ID includes three stages: data input stage, feature extraction model and distance measurement. Data input mainly refers to feeding data to feature extraction model, and the commonly used data type in object Re-ID is three-channel image. The essence of Re-ID is to compare the similarity or distance between the features extracted from two images. Image features mainly include color feature, texture feature, shape feature and spatial relationship feature. Feature extraction refers to the use of computer to extract image information to determine whether each image pixel belongs to an image feature. The deep learning methods of feature extraction may include a convolution neural network and a recurrent neural network. After feature extraction, distance measure (such as, Euclidean distance, Manhattan Distance etc.) and similarity measure (such as, Cosine Similarity, Jaccard Coefficient, etc.) can be performed. Distance measure is used to measure the distance of an individual in space, the greater the distance, the greater the difference between individuals. Similarity measurement is to calculate the degree of similarity between individuals. Contrary to distance measurement, the smaller the value of similarity measurement is, the smaller the similarity between individuals is, and the greater the difference is.

In one or more embodiments, queue management module 104 may detect an entrance point and an exit point of each queue in queue area 110. Queue management module 104 may estimate a wait time for each queue in queue area 110. For example, queue management module 104 may calculate the wait time based on people movements from entrance and exit points in each queue by analyzing a sequence of images captured from video surveillance system 106.

In one or more embodiments, queue management module 104 may dynamically report queue information in queue area 110. The queue information may include the number of the identified queues, a location of each queue, the number of people in each queue, and a wait time for each queue.

Figure 2:
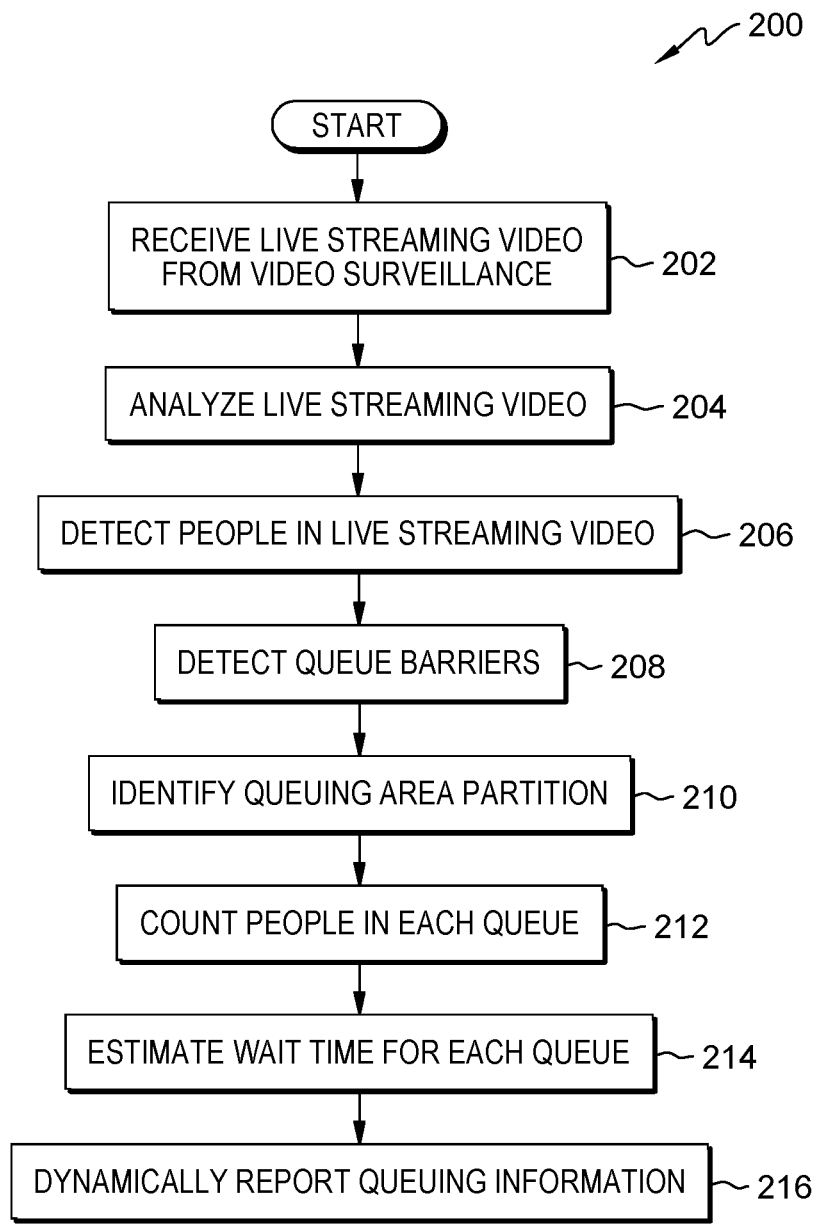
FIG. 2 is a flowchart depicting operational steps of a queue management module within a computing device of FIG. 1, in accordance with an embodiment of the present disclosure.

FIG. 2 is a flowchart 200 depicting operational steps of queue management module 104 in accordance with an embodiment of the present disclosure.

Queue management module 104 operates to receive a live streaming video from video surveillance system 106 which monitors queue area 110. Queue management module 104 also operates to analyze the live streaming video obtained from video surveillance system 106 by artificial neural network 105. Queue management module 104 operates to detect heads and people in the live streaming video. Queue management module 104 operates to detect queue barriers in queue area 110 based on the live streaming video, using instance segmentation techniques through artificial neural network 105. Queue management module 104 operates to identify queuing area partition and each queue in queue area 110 using a heuristic method. Queue management module 104 operates to count and recognize the number of people in each identified queue in queue area 110. Queue management module 104 operates to estimate a wait time for each queue in queue area 110. Queue management module 104 operates to dynamically report queue information in queue area 110.

In step 202, queue management module 104 receives a live streaming video from video surveillance system 106 which monitors queue area 110. In various embodiments of the present disclosure, queue area 110 can be an airport service area, a supermarket checkout area, a bus station ticket area, a bank teller area, a hotel service area, and a government service area (e.g., department of motor vehicles, social security office, etc.). In one or more embodiments, features of queue area 110 can be identified by artificial neural network 105, where objects such as counters, desks, monitors/computer terminals, cash registers, scales, etc. can be used to identify queue area 110. Queue area 110 includes queue barriers that are used to help separate different queues in queue area 110. Managers can add or remove queue barriers based on changes of queues. Thus, the shape and length of queues is complicated and changeable. In an example, queue barriers are tensile barriers. In another example, queue barriers can be any barrier to separate queues.

In an example, queue management module 104 may sample the live streaming video into digital images or frames. In another example, video surveillance system 106 may include a digital video camera and can take and record digital images directly.

In step 204, queue management module 104 analyzes the live streaming video and the captured images obtained from video surveillance system 106 by artificial neural network 105. In various embodiments, the captured images can be input into artificial neural network 105 as a numerical array with height, width, and depth, where the height and width can be determined by the resolution and color scale of the digital image, for example: 1280 pixel width×720 pixel height with a depth of three (3) for the red, green, blue (RGB) colors for 720p resolution; 1920 pixel width×1080 pixel height and a depth of 3 for 1080p; or 3840 pixel width×2160 pixel height and a depth of 3 for 4K resolution. The numerical array can be processed by a convolutional neural network using filters, where the filters can have a width, height, and depth less than the input image, and can be applied to convert blocks of the image array into column vectors.

In step 206, queue management module 104 detects people in the live streaming video. In various embodiments, the input image can be analyzed to identify one or more heads, where artificial neural network 105 can be trained to identify heads in the image. In various embodiments, supervised learning can be used to identify heads, where all heads in an image can be labeled, and the labeled images used to train the neural network through supervised and/or unsupervised learning. With advanced object detection algorithm(s) and a stochastic gradient descent optimization method, artificial neural network 105 has the capability to identify heads and ignore similar round objects. In various embodiments, since heads contain little semantic features (they are mostly similar), particular features of heads are not extracted. In various embodiments, local image patches (e.g., blocks) of the input image can each be analyzed to identify one or more heads. The identified heads can be counted to take a headcount in the digital image.

In various embodiments, the blocks and filters may have a size optimized for identifying heads in the field of view of the camera, where the resolution of the image, the distance of the camera from the objects in the field of view, and the scaling of the image can influence the number of pixels that would depict an average head. In various embodiments, for example, the heads can be 20×20 pixels of the digital image or larger, where the block size can be adjusted to optimize (e.g., increase confidence values) that all or almost all heads are correctly identified.

In various embodiments, once the heads have been identified in the input image, the number of identified heads can be counted to establish an initial estimate of people in the monitored area of queue area 110. Since heads may be obscured or not identified with 100% accuracy, the number of heads counted may not be identical to the exact number of people present in the monitored area.

In various embodiments, the input image can be analyzed to identify one or more bodies, where artificial neural network 105 can be trained to identify bodies in the image. Features of a body can be extracted, for example, as a 2048 dimension vector that is not human-readable, where the extracted features can represent clothing (e.g., shirts, pants, etc.). Artificial neural network 105 can be a deep-learning neural network that extracts the features for building the feature vector. One or more filters can be applied to the input image to identify features of a body, where not all the features are necessarily present or observable in the image. In addition, the placement of some people in the field of view can obscure or occlude other people next to or behind them making identification of a distinct body difficult or impossible. Positioning of individuals' bodies in the image can be inconsistent, such that each block of the input image may contain no body, one body, or more than one body, at different times. The extracted feature vector can be used to track the placement and movement of identified bodies.

In various embodiments, once the bodies have been identified in the input image, the number of identified bodies can be counted to establish a second estimate of people in the monitored area of queue area 110. Since bodies may be obscured or not identified with 100% accuracy, the number of bodies counted may not be identical to the exact number of people present in the monitored area, and may be different from the number of heads counted.

In one or more embodiments, the number of heads and the number of bodies can be analyzed to arrive at a more accurate count of the number of people in the field of view of the digital video camera. The bodies and heads can be separately detected by artificial neural network 105. Bodies can be matched with heads based upon coinciding positioning. When a head is detected, but a corresponding body is not identified in an expected coinciding position, artificial neural network 105 can infer that an associated body is present (but possibly occluded) to rectify the number of heads to bodies (e.g., one (1) can be added to the number of identified bodies. The number of people present in the digital image can, thereby, be reconciled in favor of the number of heads. Similarly, artificial neural network 105 can infer that an associated head is present (but possibly occluded), when a corresponding head is not identified in an expected position for an identified body to rectify the number of bodies to heads. One (1) can be added to the number of identified heads. A Hungarian algorithm can be used to match heads with bodies and/or bodies to heads (i.e., rectified). A total number of people can then be determined from the rectified number of heads to bodies and rectified number of bodies to heads. If a head and a body can be matched based upon coinciding positioning, they can be identified (labeled) as belonging to same person. For heads (or bodies) that are unmatched, they can be identified (labeled) as belonging to new persons. Both head set and body set can be divided into matched subsets and unmatched subsets. In various embodiments, a final number of people can be calculated as the matched subset+the subset of unmatched heads+the subset of unmatched bodies.

In step 208, queue management module 104 detects queue barriers in queue area 110 based on the live streaming video, using instance segmentation techniques through artificial neural network 105. Queue management module 104 may detect and delineate each queue barrier in the input image from queue area 110. Queue management module 104 may identify each queue barrier through artificial neural network 105 based on the input image. There are various techniques that are used in computer vision tasks. Some of them include classification, semantic segmentation, object detection, and instance segmentation. Classification tells that the image belongs to a particular class. Classification doesn't consider the detailed pixel level structure of the image. Classification consists of making a prediction for a whole input. Semantic segmentation makes dense predictions inferring labels for each pixel so that every pixel in the image is labeled with the class of its enclosing object. Object detection provides not only the classes but also indicate the spatial location of those classes. Object detection takes into account the overlapping of objects. Instance segmentation includes identification of boundaries of the objects at the detailed pixel level. In an example, artificial neural network 105 is a convolutional neural network that is a class of deep neural networks for analyzing visual imagery and applies an instance segmentation method to detect queue barriers in queue area 110. In another example, artificial neural network 105 is a mask region based convolutional neural network (Mask R-CNN) that creates a boundary around every object that is present in the given image. Mask R-CNN can locate each pixel of every object in the image. In another example, artificial neural network 105 can be any neural network that may apply an instance segmentation method to detect queue barriers in queue area 110.

In step 210, queue management module 104 identifies queuing area partition and each queue in queue area 110 using a heuristic method. A heuristic method is generally a method that ranks alternatives in search algorithms at each branching step based on available information to decide which branch to follow. In one or more embodiments of the present disclosure, queue management module 104 may first calculate the convex hull of adjacent queue barriers. In order to find a more precise boundary, queue management module 104 analyzes the skeleton of the queue barriers and modifies the convex hull with skeleton. After finding the partition of a queue, queue management module 104 can recognize people in the queue partition. An example for identifying a queue in queue area 110 is depicted and described in further detail with respect to FIGS. 3A-3D.

In step 212, queue management module 104 counts and recognizes the number of people in each identified queue in queue area 110. As discussed above, queue management module 104 may identify the heads and bodies from the input image from video surveillance system 106 in queue area 110. After queue management module 104 identifies each queue in queue area 110, queue management module 104 may find the number of people in each queue based on the identified heads and bodies from the input image from video surveillance system 106 using an Re-ID technique. Object Re-ID generally means that a recognized object is identified again after imaging conditions (including monitoring scene, lighting conditions, object pose, etc.) change. A Re-ID technique is a technology that uses computer vision technology to judge whether there is a specific person or object in the image or video sequence. In deep learning method, the general technical route of object Re-ID includes three stages: data input stage, feature extraction model and distance measurement. Data input mainly refers to feeding data to feature extraction model, and the commonly used data type in object Re-ID is three-channel image. The essence of Re-ID is to compare the similarity or distance between the features extracted from two images. Image features mainly include color feature, texture feature, shape feature and spatial relationship feature. Feature extraction refers to the use of computer to extract image information to determine whether each image pixel belongs to an image feature. The deep learning methods of feature extraction may include a convolution neural network and a recurrent neural network. After feature extraction, distance measure (such as, Euclidean distance, Manhattan Distance etc.) and similarity measure (such as, Cosine Similarity, Jaccard Coefficient, etc.) can be performed. Distance measure is used to measure the distance of an individual in space, the greater the distance, the greater the difference between individuals. Similarity measurement is to calculate the degree of similarity between individuals. Contrary to distance measurement, the smaller the value of similarity measurement is, the smaller the similarity between individuals is, and the greater the difference is.

In step 214, queue management module 104 estimates a wait time for each queue in queue area 110. In one or more embodiments, queue management module 104 may detect an entrance point and an exit point of each queue in queue area 110. Queue management module 104 may calculate the wait time based on people movements from entrance and exit points in each queue by analyzing a sequence of images captured from video surveillance system 106.

In step 216, queue management module 104 dynamically reports queue information in queue area 110. The queue information may include the number of the identified queues, the location of each queue, the number of people in each queue, and a wait time for each queue.

FIGS. 3A-3D illustrate a heuristic method that identifies different queues in queue area 110 by queue management module 104 of computing device 102 in FIG. 1, in accordance with an embodiment of the present disclosure.

Figure 3A:
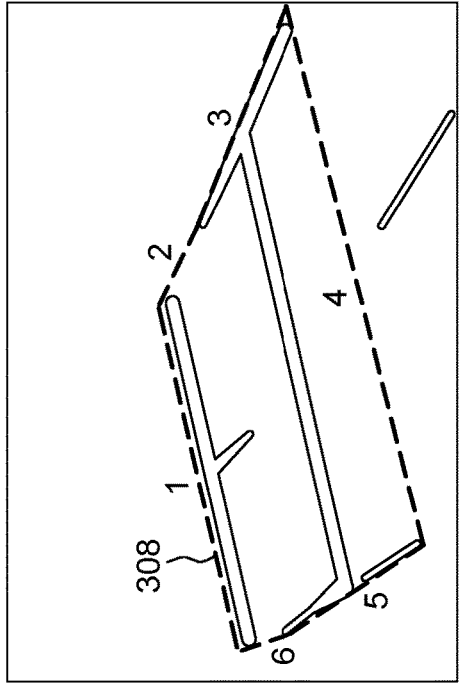
FIGS. 3A-3D illustrate a heuristic method that identifies different queues in an queue area by the queue management module of computing device in FIG. 1, in accordance with an embodiment of the present disclosure.

FIG. 3A shows exemplary queue barriers 300 detected by queue management module 104 of computing device 102 in FIG. 1. Queue barrier 304 and queue barrier 306 are two adjacent barriers. To find a queue of the two adjacent queue barrier 304 and queue barrier 306 within circle 302, queue management module 104 finds corner points and a skeleton of each queue barrier of queue barriers 304, 306 using an open source computer vision and machine learning software library. For example, the open source computer vision library can be an OpenCV program or any other suitable program with that queue management module 104 can find corner points and a skeleton of each queue barrier of queue barriers 304, 306.

The system includes a heuristic method that identifies different queuing partitions. The system may first calculate the convex hull of adjacent tensile barriers. In order to find a more precise boundary, the system analyzes the skeleton of tensile barriers and modifies convex hull with skeleton. After finding a queue partition, the system can recognize people in different queue partitions. What's more, by analyzing the skeleton of tensile barriers, the system can also find the exit and entrance points of a queue. The system observes theses points and does feature matching at these points for a wait time estimation.

Figure 3B:
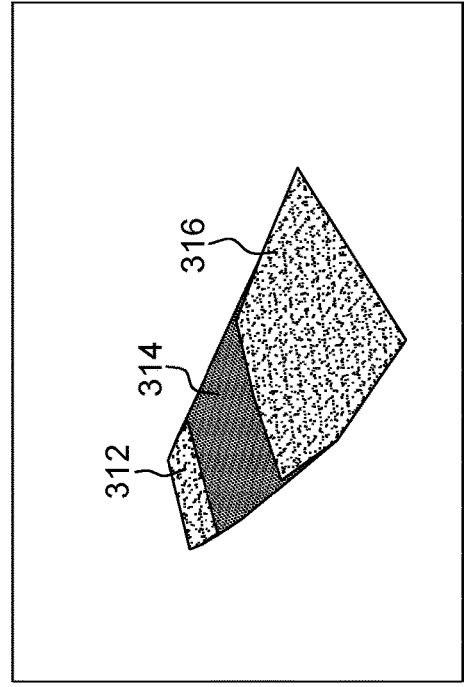

Referring to FIG. 3B, queue management module 104 finds convex hull 308 that cover all pixels of the two queue barriers 304, 306 (designated in dash circle 302 in FIG. 3A). Convex hull 308 includes lines 1-6 in FIG. 3B. For each line in convex hull 308, queue management module 104 decides what type of line it belongs to. There are three types of lines in convex hull 308. Type I line is a line from the original skeleton of queue barriers 304, 306. Queue management module 104 determines lines 1, 3, 5 are from the original skeleton of queue barriers 304, 306 and are Type I line. Line 1 is from the original skeleton of queue barrier 304. Lines 3 and 5 are from the original skeleton of queue barrier 306.

Type II line is a line that connects two queue barriers 304, 306. Type II line is an entrance or exit point of a queue. Queue management module 104 determines lines 2, 6 are lines that connect queue barriers 304, 306 and are Type II line. Type III line is a line that does not belong to any original queue barrier skeleton of queue barriers 304, 306. Queue management module 104 determines that line 4 does not belong to any original queue barrier skeleton of queue barriers 304, 306 and is Type III line. For Type III line, queue management module 104 may modify such line with one or multiple lines that are edge lines of the original queue barriers.

Figure 3C:
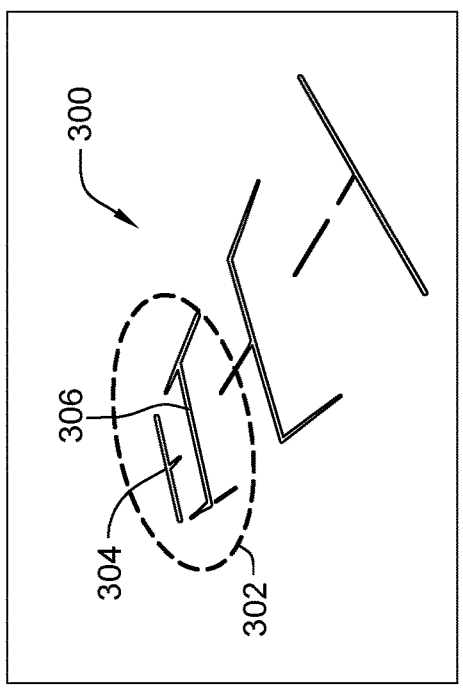

For example, as shown in FIG. 3C, for line 4 in FIG. 3B, queue management module 104 replaces line 4 with line 4_1, line 4_2, and line 4_3 in FIG. 3C. Convex hull 310 (new polygon) includes line 1, line 2, line 3, line 4_1, line 4_2, line 4_3, line 5, and line 6. Queue management module 104 finds convex hull 310 is a queue (queue with entrance and exit points at line 2 and line 6.)

Figure 3D:
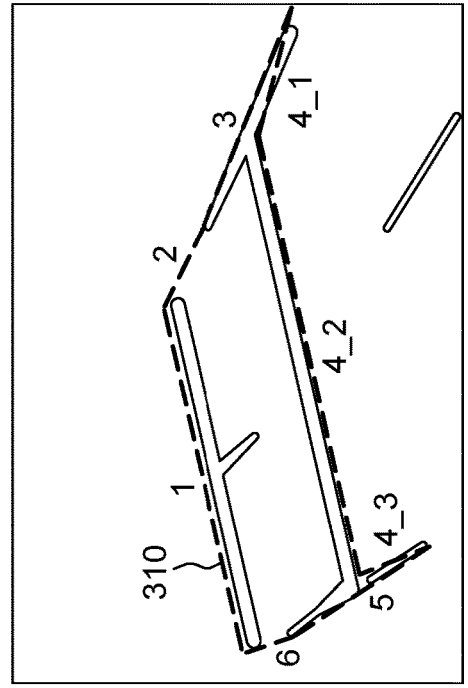

Queue management module 104 repeats the same process for other queue barriers as discussed above for queue barriers 304, 306 designated within dash circle 302. Queue management module 104 further finds queue 314 and queue 316 as shown in FIG. 3D. Accordingly, queue management module 104 finds queue 312, queue 314, and queue 316 as shown in FIG. 3D for queue barriers designated as 300 in FIG. 3A.

Figure 4:
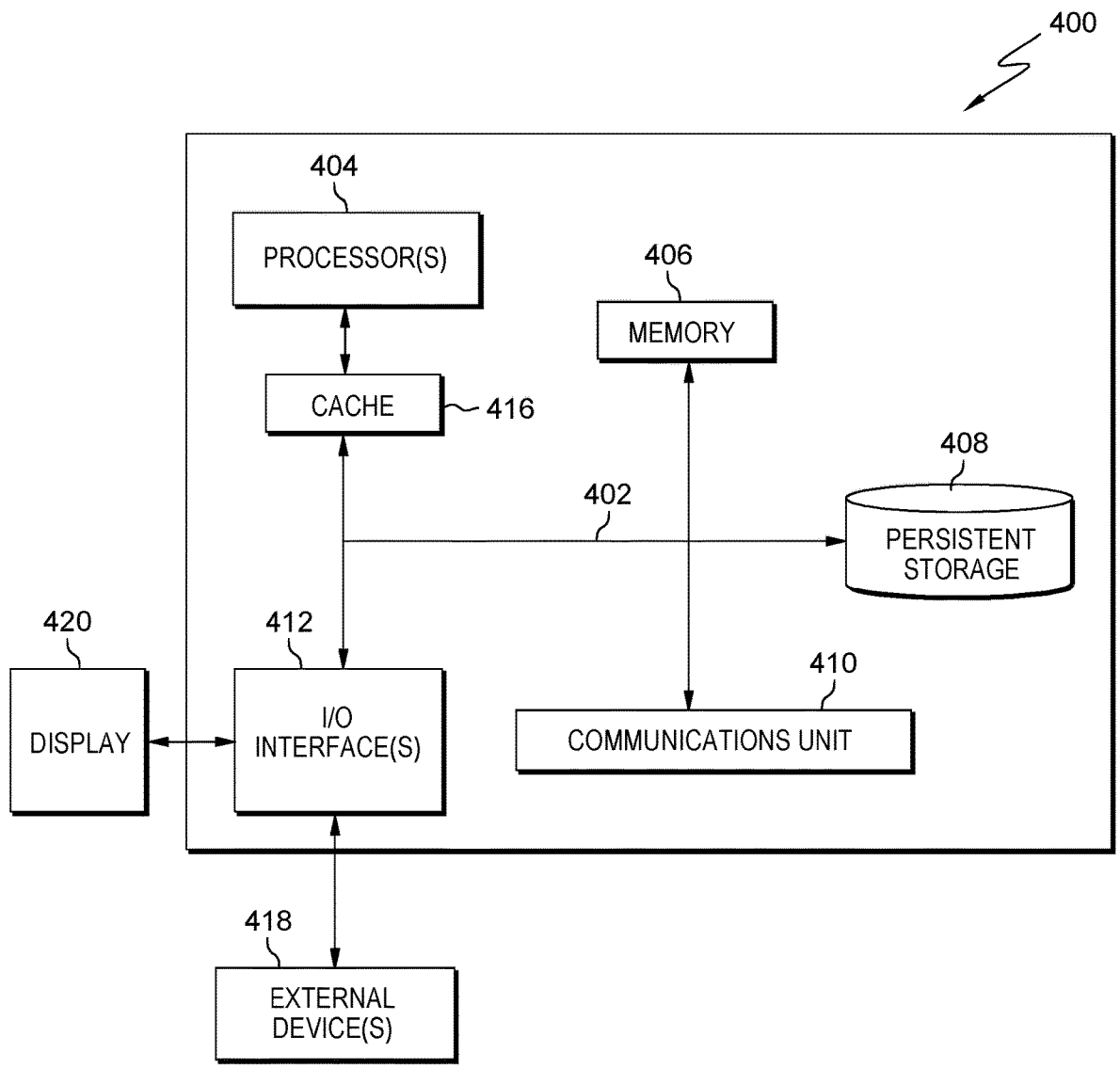
FIG. 4 is a block diagram of components of the computing device in FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Queue management module 104 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Queue management module 104 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., queue management module 104 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
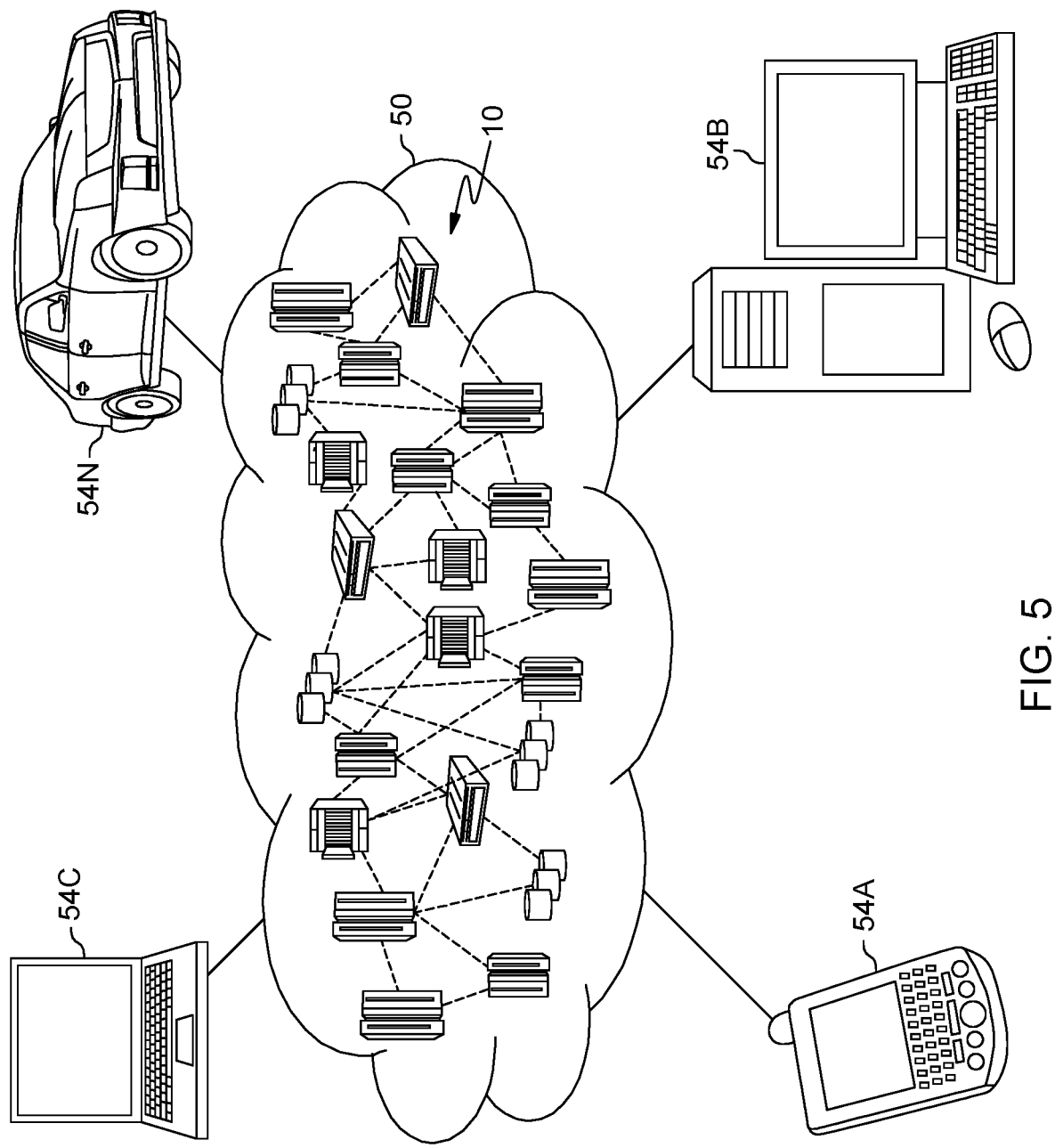
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
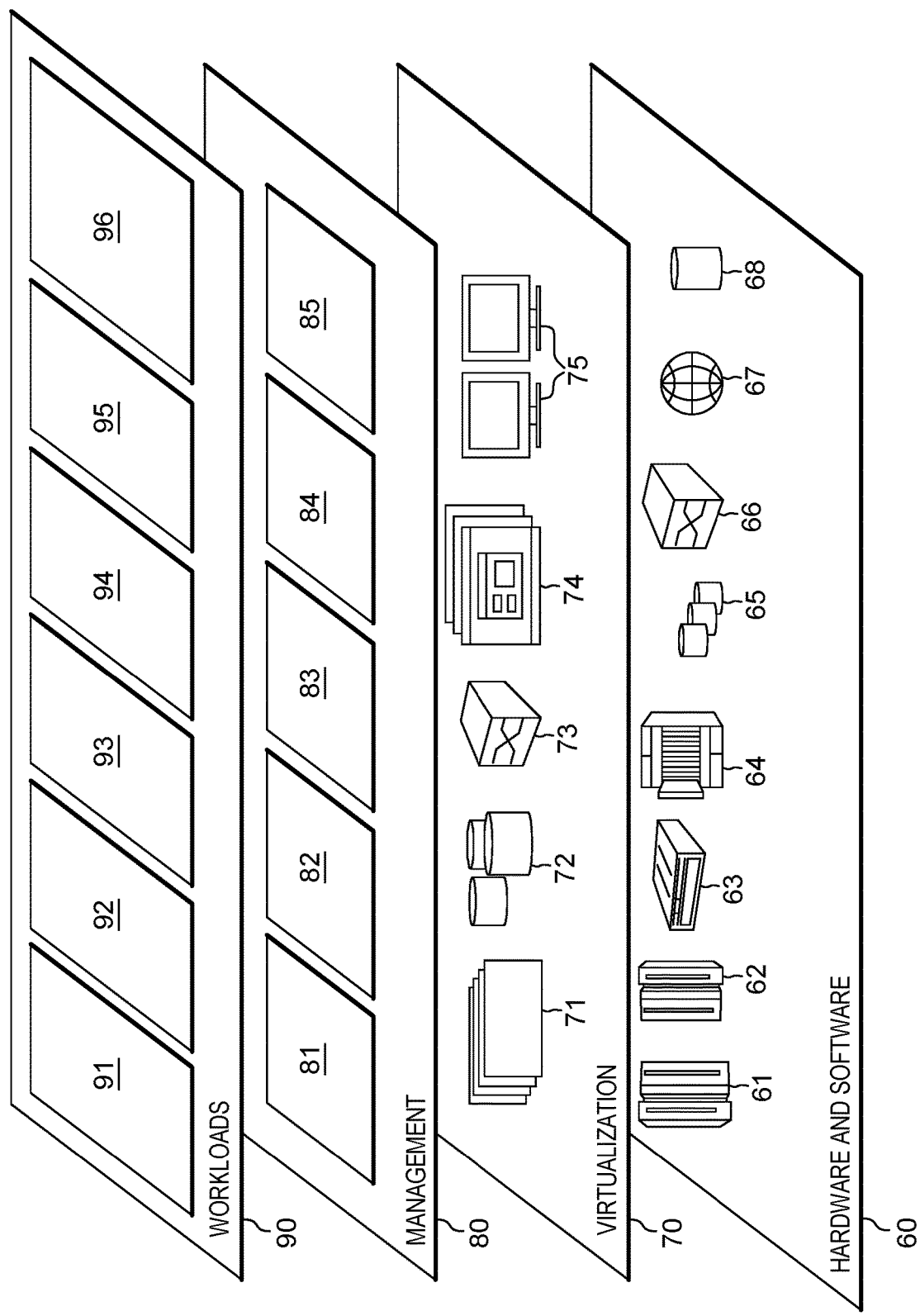
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, queue management module 104 as described above with respect to queue management environment 100.

Figure 7:
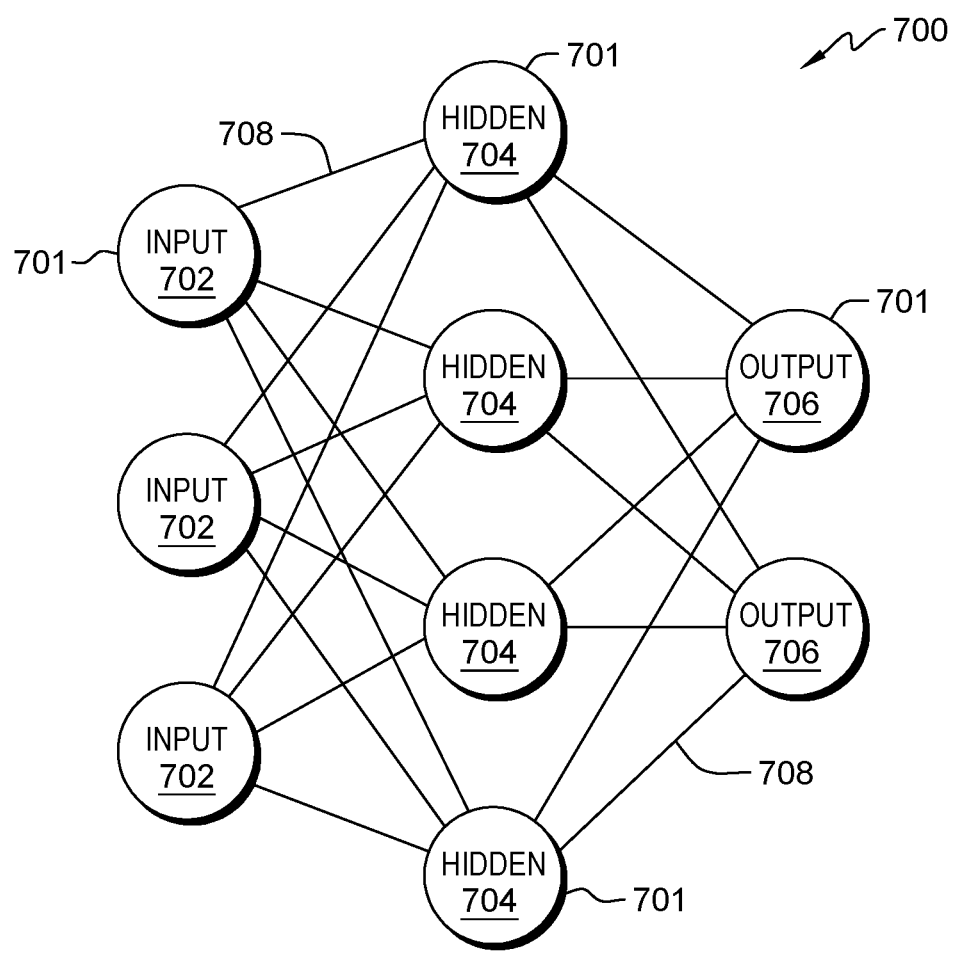
FIG. 7 is a block diagram illustratively depicting an exemplary artificial neural network, in accordance with an embodiment of the present invention.

FIG. 7 is a block diagram illustratively depicting an exemplary artificial neural network, in accordance with an embodiment of the present invention.

Artificial neural networks demonstrate an ability to derive meaning from complicated or imprecise data and can be used to extract patterns and detect trends that are too complex to be detected by humans or other computer-based systems. Artificial neural network 700 may include a plurality of neurons/nodes 701, and nodes 701 may communicate using one or more of a plurality of connections 708. Artificial neural network 700 may include a plurality of layers, including, for example, one or more input layers 702, one or more hidden layers 704, and one or more output layers 706. In an embodiment, nodes 701 at each layer may be employed to apply any function (e.g., input program, input data, etc.) to any previous layer to produce output, and hidden layer 704 may be employed to transform inputs from the input layer (or any other layer) into output for nodes 701 at different levels.

This represents a "feed-forward" computation, where information propagates from input layers 702 to output layers 706. Upon completion of a feed-forward computation, the output is compared to a desired output available from training data. The error relative to the training data is then processed in "feed-back" computation, where hidden layers 704 and input layers 702 receive information regarding the error propagating backward from output layers 706. Once the backward error propagation has been completed, weight updates are performed, with weighted connections 708 being updated to account for the received error.

Figure 8:
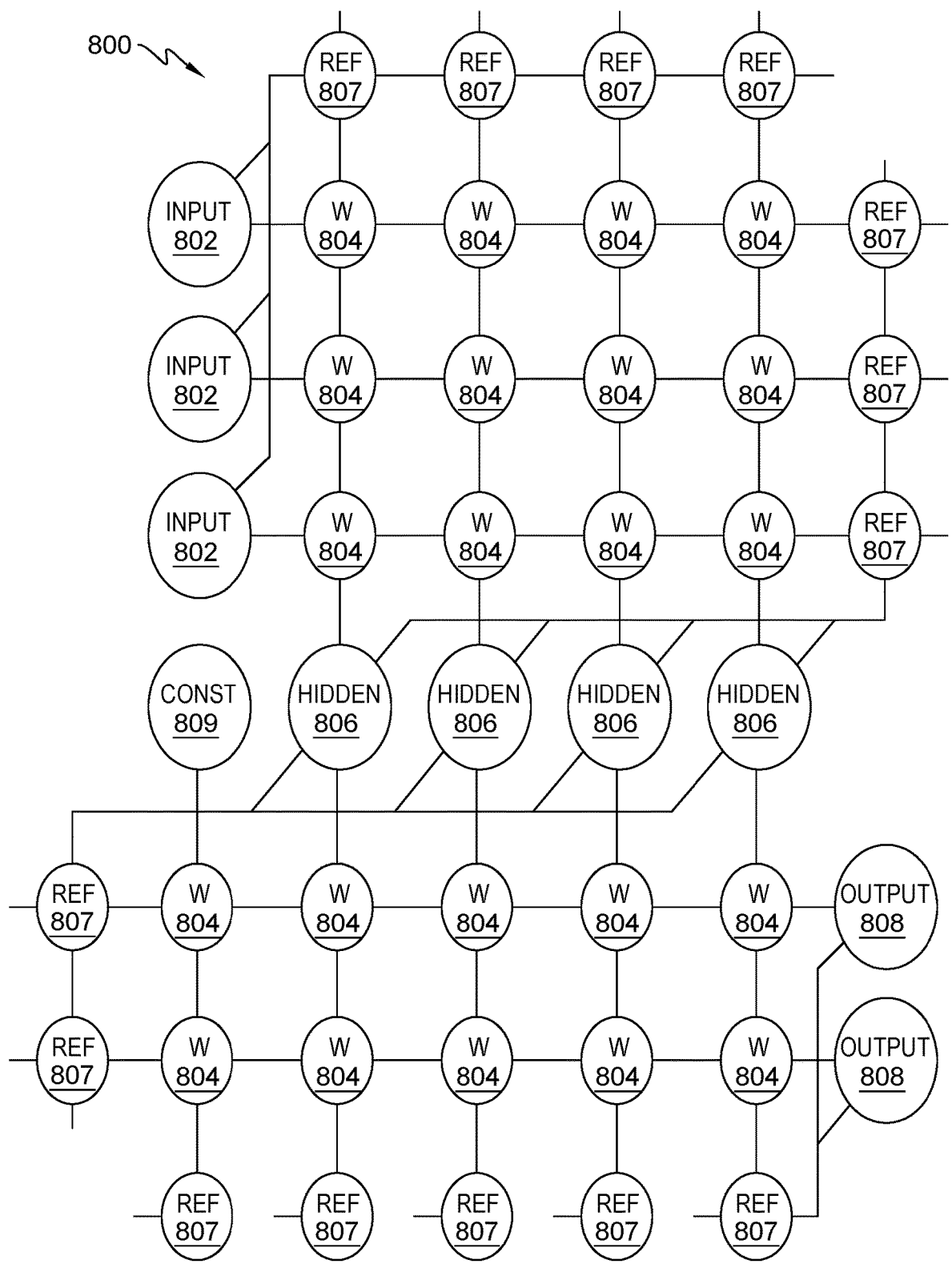
FIG. 8 is a block diagram illustratively depicting an exemplary artificial neural network architecture, in accordance with an embodiment of the present invention.

FIG. 8 is a block diagram illustratively depicting an exemplary artificial neural network architecture 800, in accordance with an embodiment of the present invention.

It should be understood that artificial neural network architecture 800 is purely exemplary and that other architectures or types of neural network may be used instead. During feed-forward operation, a set of input neurons 802 each provide an input voltage in parallel to a respective row of weights 804. Weights 804 each have a settable resistance value, such that a current output flows from the weight 804 to a respective hidden neuron 806 to represent the weighted input. The current output by a given weight is determined as I=V/r, where V is the input voltage from input neuron 802 and r is the set resistance of weight 804. The current from each weight adds column-wise and flows to hidden neuron 806. A set of reference weights 807 have a fixed resistance and combine their outputs into a reference current that is provided to each of hidden neurons 806. Because conductance values can only be positive numbers, some reference conductance is needed to encode both positive and negative values in the matrix. The currents produced by weights 804 are continuously valued and positive, and therefore reference weights 807 are used to provide a reference current, above which currents are considered to have positive values and below which currents are considered to have negative values.

As an alternative to using reference weights 807, another embodiment may use separate arrays of weights 804 to capture negative values. Each approach has advantages and disadvantages. Using reference weights 807 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 804 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

Hidden neurons 806 use the currents from the array of weights 804 and reference weights 807 to perform some calculation. Hidden neurons 806 then output a voltage of their own to another array of weights 804. This array performs in the same way, with a column of weights 804 receiving a voltage from their respective hidden neuron 806 to produce a weighted current output that adds row-wise and is provided to output neuron 808.

It should be understood that any number of these stages may be implemented, by interposing additional layers of arrays and hidden neurons 806. It should also be noted that some neurons may be constant neurons 809, which provide a constant voltage to the array. Constant neurons 809 can be present among input neurons 802 and/or hidden neurons 806 and are only used during feed-forward operation.

During back propagation, output neurons 808 provide a voltage back across the array of weights 804. The output layer compares the generated network response to training data and computes an error. The error is applied to the array as a voltage pulse, where the height and/or duration of the pulse is modulated proportional to the error value. In this example, a row of weights 804 receives a voltage from a respective output neuron 808 in parallel and converts that voltage into a current which adds column-wise to provide an input to hidden neurons 806. Hidden neurons 806 combine the weighted feedback signal with a derivative of its feed-forward calculation and stores an error value before outputting a feedback signal voltage to its respective column of weights 804. This back propagation travels through the entire network 800 until all hidden neurons 806 and input neurons 802 have stored an error value.

During weight updates, input neurons 802 and hidden neurons 806 apply a first weight update voltage forward and output neurons 808 and hidden neurons 806 apply a second weight update voltage backward through neural network 800. The combinations of these voltages create a state change within each weight 804, causing weight 804 to take on a new resistance value. In this manner weights 804 can be trained to adapt neural network 800 to errors in its processing. It should be noted that the three modes of operation, feed forward, back propagation, and weight update, do not overlap with one another.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
analyzing a video monitoring a queue area;
detecting a queue barrier in the queue area using an instance segmentation technique based on the video;
identifying a queue in the queue area using a heuristic technique, wherein the heuristic technique includes calculating a convex hull of adjacent queue barriers, analyzing a skeleton of the queue barriers, and modifying the convex hull with the skeleton;
recognizing a number of people in the queue, wherein recognizing the number of people comprises:
detecting bodies and heads of the people separately,
matching the bodies with the heads based upon coinciding positioning,
inferring that an associated body is present to rectify the number of heads to bodies,
inferring that an associated head is present to rectify the number of bodies to heads, and
determining the number of people based on the rectified number of heads to bodies and rectified number of bodies to heads;
detecting an entrance point of the queue;
detecting an exit point of the queue;
providing an estimation of a wait time for the queue by calculating the wait time based on people movements from the entrance and exit points by analyzing a sequence of images captured from the video monitoring the queue area;
identifying a plurality of queues in the queue area; and
dynamically reporting the number of the plurality of queues identified, a location of each queue, the number of people in each queue, and a wait time for each queue.

2. The computer-implemented method of claim 1, wherein the instance segmentation technique is a convolutional neural network.

3. The computer-implemented method of claim 1, wherein the queue barrier is a tensile barrier.

4. A computer program product comprising:
one or more computer readable storage media and program instructions stored on the one or more computer readable storage media, wherein the one or more computer readable storage media are not transitory signals per se, the program instructions comprising:
program instructions to analyze a video monitoring a queue area;
program instructions to detect a queue barrier in the queue area using an instance segmentation technique based on the video;
program instructions to identify a queue in the queue area using a heuristic technique, wherein the heuristic technique includes calculating a convex hull of adjacent queue barriers, analyzing a skeleton of the queue barriers, and modifying the convex hull with the skeleton;
program instructions to recognize a number of people in the queue, wherein program instructions to recognize the number of people comprises:
program instructions to detect bodies and heads of the people separately,
program instructions to match the bodies with the heads based upon coinciding positioning,
program instructions to infer that an associated body is present to rectify the number of heads to bodies,
program instructions to infer that an associated head is present to rectify the number of bodies to heads, and
program instructions to determine the number of people based on the rectified number of heads to bodies and rectified number of bodies to heads;
program instructions to detect an entrance point of the queue;
program instructions to detect an exit point of the queue;
program instructions to provide an estimation of a wait time for the queue by calculating the wait time based on people movements from the entrance and exit points by analyzing a sequence of images captured from the video monitoring the queue area;
program instructions to identify a plurality of queues in the queue area; and
program instructions to dynamically report the number of the plurality of queues identified, a location of each queue, the number of people in each queue, and a wait time for each queue.

5. The computer program product of claim 4, wherein the instance segmentation technique is a convolutional neural network.

6. The computer program product of claim 4, wherein the queue barrier is a tensile barrier.

7. A computer system comprising:
one or more computer processors, one or more computer readable storage media, and program instructions stored on the one or more computer readable storage media for execution by at least one of the one or more computer processors, the program instructions comprising:
program instructions to analyze a video monitoring a queue area;
program instructions to detect a queue barrier in the queue area using an instance segmentation technique based on the video;
program instructions to identify a queue in the queue area using a heuristic technique, wherein the heuristic technique includes calculating a convex hull of adjacent queue barriers, analyzing a skeleton of the queue barriers, and modifying the convex hull with the skeleton;
program instructions to recognize a number of people in the queue, wherein program instructions to recognize the number of people comprises:
program instructions to detect bodies and heads of the people separately,
program instructions to match the bodies with the heads based upon coinciding positioning,
program instructions to infer that an associated body is present to rectify the number of heads to bodies,
program instructions to infer that an associated head is present to rectify the number of bodies to heads, and
program instructions to determine the number of people based on the rectified number of heads to bodies and rectified number of bodies to heads;
program instructions to detect an entrance point of the queue;
program instructions to detect an exit point of the queue;
program instructions to provide an estimation of a wait time for the queue by calculating the wait time based on people movements from the entrance and exit points by analyzing a sequence of images captured from the video monitoring the queue area;

program instructions to identify a plurality of queues in the queue area; and program instructions to dynamically report the number of the plurality of queues identified, a location of each queue, the number of people in each queue, and a wait time for each queue.

8. The computer system of claim 7, wherein the instance segmentation technique is a convolutional neural network.

\* \* \* \* \*